United States Patent [19]
Elferich

[11] Patent Number: 5,684,351
[45] Date of Patent: Nov. 4, 1997

[54] ELECTRICAL DRIVING DEVICE COMPRISING MORE THAN ONE PERMANENT-MAGNET-EXCITED ROTOR AND A SHAVER COMPRISING SAID DRIVING DEVICE

[75] Inventor: Reinhold Elferich, Aachen, Germany

[73] Assignee: U.S. Philips Corporation, New York, N.Y.

[21] Appl. No.: 582,812

[22] Filed: Jan. 4, 1996

[30] Foreign Application Priority Data

Jan. 4, 1995 [DE] Germany ............... 195 00 112.5

[51] Int. Cl.$^6$ ................................. H02K 16/00
[52] U.S. Cl. ............... 310/112; 310/114; 310/156; 310/254; 310/47
[58] Field of Search ................. 310/112, 114, 310/40 MM, DIG. 6, 186, 254, 156, 126, 47, 50; 30/45, 43.6

[56] References Cited

U.S. PATENT DOCUMENTS

| | | | |
|---|---|---|---|
| 2,487,846 | 11/1949 | Boelsums | 310/254 |
| 2,782,328 | 2/1957 | Lindberg | 310/254 |
| 3,651,355 | 3/1972 | Mason | 310/112 |
| 3,723,796 | 3/1973 | Mason | 310/112 |
| 4,221,984 | 9/1980 | Mason | 310/112 |
| 4,359,761 | 11/1982 | Papst | 360/963 |
| 4,503,346 | 3/1985 | Bertram et al. | 310/49 R |
| 4,701,652 | 10/1987 | Braun | 310/112 |
| 4,755,703 | 7/1988 | Ueno | 310/184 |
| 5,130,594 | 7/1992 | Taghezout et al. | 310/256 |
| 5,365,137 | 11/1994 | Richardson et al. | 310/258 |

FOREIGN PATENT DOCUMENTS

| | | | |
|---|---|---|---|
| 726584 | 11/1931 | France | 310/112 |

*Primary Examiner*—Thomas M. Dougherty
*Assistant Examiner*—Burton S. Mullins
*Attorney, Agent, or Firm*—Edward Blocker

[57] ABSTRACT

An electrical driving device has three permanent-magnet-excited rotors 3 whose shafts 3S extend through intersections S between a circle 4 and 120° spaced-apart radii 5 which diverge from the centre M of the circle. Each of the cylindrical rotors 3 is associated with three stator poles 7.1, 7.2, 7.3, which are spaced from the cylinder circumference by air gaps 6. Three of these stator poles 7.1 which are situated within the circle 4 are connected by means of yoke irons $J_1$. The stator poles 7.2 and 7.3 situated outside the circle 4 are connected in pairs via yoke bridges $J_2$. These yoke bridges $J_2$ are, in their turn, connected to yoke irons $J_3$, which carry excitation coils 10. At their ends which are remote from the yoke bridges $J_2$ all the yoke irons $J_3$ are magnetically connected via a return yoke $J_4$. The yoke iron $J_1$, the stator poles 7.1, 7.2 and 7.3, the Yoke bridges $J_2$ interconnecting them, the yoke iron $J_3$ and the return yoke $J_4$ consist of solid iron or electric sheet.

15 Claims, 5 Drawing Sheets the invention relates to an electrical driving device
5,684,351

ELECTRICAL DRIVING DEVICE COMPRISING MORE THAN ONE PERMANENT-MAGNET-EXCITED ROTOR AND A SHAVER COMPRISING SAID DRIVING DEVICE

BACKGROUND OF THE INVENTION

The invention relates to an electrical driving device comprising more than one permanent-magnet rotor and an electrically excitable stator which forms three stator poles for each of the rotors.

The invention also relates to a shaver comprising a housing and a plurality of shaving heads, each shaving head having a cutter.

FR 726,584 also describes a motor having a plurality of rotors. This motor is a single-phase motor, in which the armature windings are disposed on the stator. The armature windings cooperate with permanent-magnet rotors. Since it operates with two pole shoes per rotor and only one main flux path this system is very unstable without any additional measures. Therefore, additional measures have been taken such that additional auxiliary pole shoes provided with coils are arranged in the stator to enable starting in a given direction of rotation. The additional means as a result of the measures, which are needed only during starting, lead to increased motor dimensions and render the motor uneconomical.

To drive the rotating cutters of rotary dry-shavers it is customary that the driving movement of a motor is shared by and transmitted to a plurality of cutters via a drive mechanism. This construction of such a drive system results in a substantial axial length and gives rise to undesirable noise.

SUMMARY OF THE INVENTION

It is an object of the invention to provide an electric motor comprising two or three rotors, which requires only three armature coils to start the motor in a given direction of rotation.

It is another object of the invention to provide a shaver which has a very flat construction.

According to the invention this object is achieved in that the device comprises three rotors, each rotor being associated with a first, a second and a third stator pole, each first stator pole of a rotor being connected to a first stator pole of another rotor by means of a yoke iron, each second stator pole of a rotor being connected to a third stator pole of another rotor by means of a yoke iron, the last-mentioned yoke-iron connections being joined at a return yoke by means of one yoke iron each, each of the three yoke irons joined at the return yoke each being surrounded by an excitation coil, the first, second and third stator poles being positioned in the same circumferential sequence for all rotors.

In this way only three excitation coils are required and proper starting is ensured of all three rotors in the same direction.

In another embodiment of the invention the device comprises two rotors, each rotor being associated with a first, a second and a third stator pole, the first stator poles being connected by means of a yoke iron, the second stator poles being connected by means of a yoke iron, the third stator poles being connected by means of a yoke iron, each of the said yoke-iron connections being surrounded by an excitation coil, the first, the second and the third stator poles being positioned in the same circumferential sequence.

In this way only three excitation coils are required and proper starting is ensured of both rotors in the same direction.

Preferably, the excitation coils in both embodiments are commutated electronically.

The shaver according to the invention is characterized in that it comprises an electrical driving device according to the invention and in that each cutter is driven by an associated rotor of said driving device.

When such a construction is used the drive mechanism, which leads to an increased overall length and gives rise to noise and losses, can be dispensed with. This is particularly advantageous for dry-shavers.

BRIEF DESCRIPTION OF THE DRAWING

The invention will now be described in more detail with reference to the drawings. In the drawings.

DETAILED DESCRIPTION OF THE PREFERRED EMBODIMENTS

Figure 1:
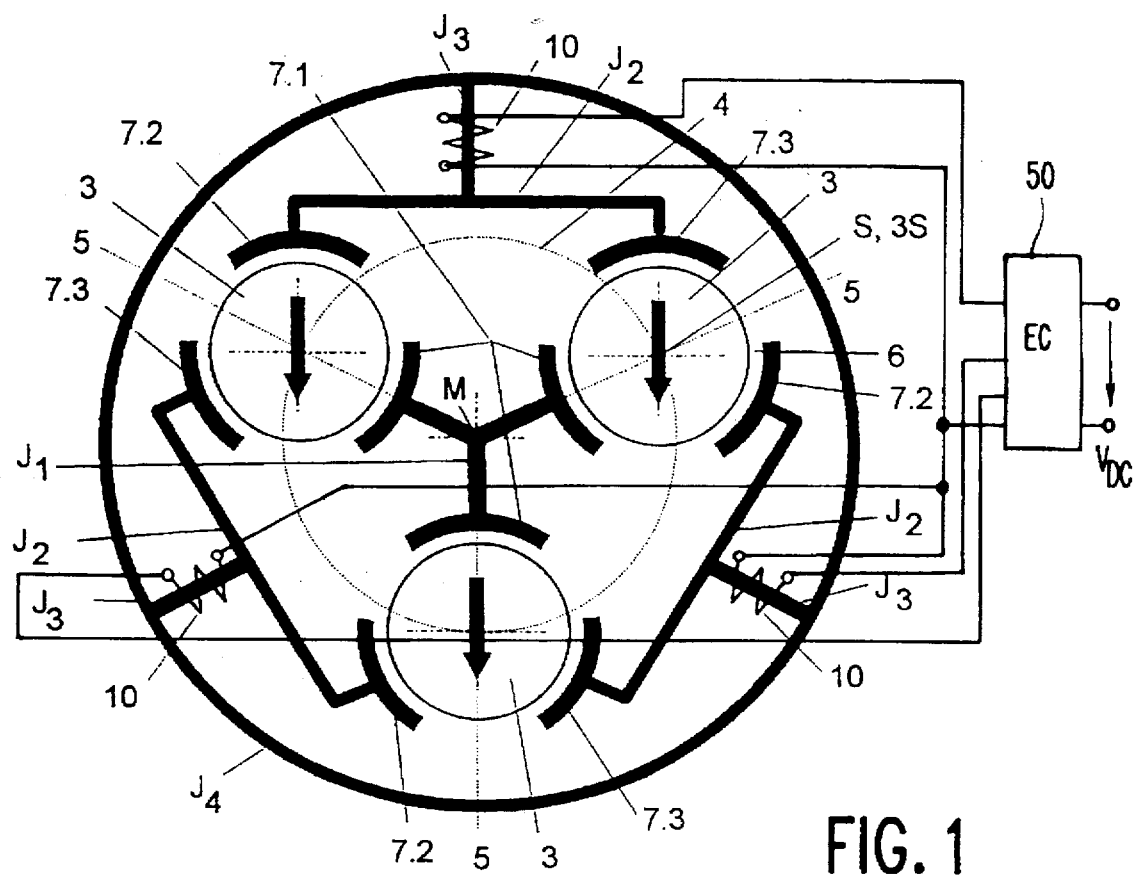
FIG. 1 is a basic diagram of an electrical driving device comprising three permanent-magnet-excited rotors and three excitation coils arranged in the stator so as to form a three-phase motor, the three rotor shafts being situated on a circle at points where the circle is intersected by three 120° spaced-apart radii.

An electrical driving device shown in FIG. 1 has three permanent-magnet-excited rotors 3 whose shafts 3S extend through intersections S between a circle 4 and 120° spaced-apart radii 5 which diverge from the centre M of the circle. Each of the cylindrical rotors 3 is associated with three stator poles 7.1, 7.2, 7.3, which are spaced from the cylinder circumference by air gaps 6. Three of these stator poles 7.1 which are situated within the circle 4 are connected by means of yoke irons $J_1$. The stator poles 7.2 and 7.3 situated outside the circle 4 are connected in pairs via yoke bridges $J_2$. These yoke bridges $J_2$ are, in their turn, connected to yoke irons $J_3$, which carry excitation coils 10. Excitation coils 10 are electronically commutated by a commutator 50. At their ends which are remote from the yoke bridges $J_2$ all the yoke irons $J_3$ are magnetically connected via a return yoke $J_4$. The yoke iron $J_1$, the stator poles 7.1, 7.2 and 7.3, the yoke bridges $J_2$ interconnecting them, the yoke iron $J_3$ and the return yoke $J_4$ are made of solid iron or electric sheet.

The rotor shafts need not pass through a circle. Other arrangements relative to one another are also possible.

Figure 2:
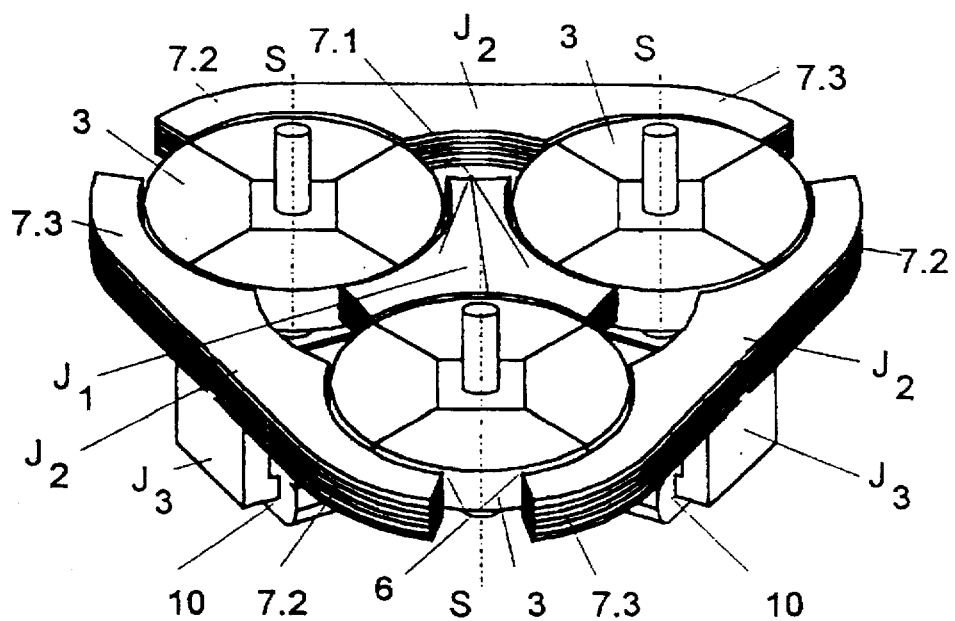
FIG. 2 is a perspective view of the drive system shown in FIG. 1, comprising three permanent-magnet rotors and three excitation coils in an arrangement with radially magnetised four-pole rotor discs.
Figure 3:
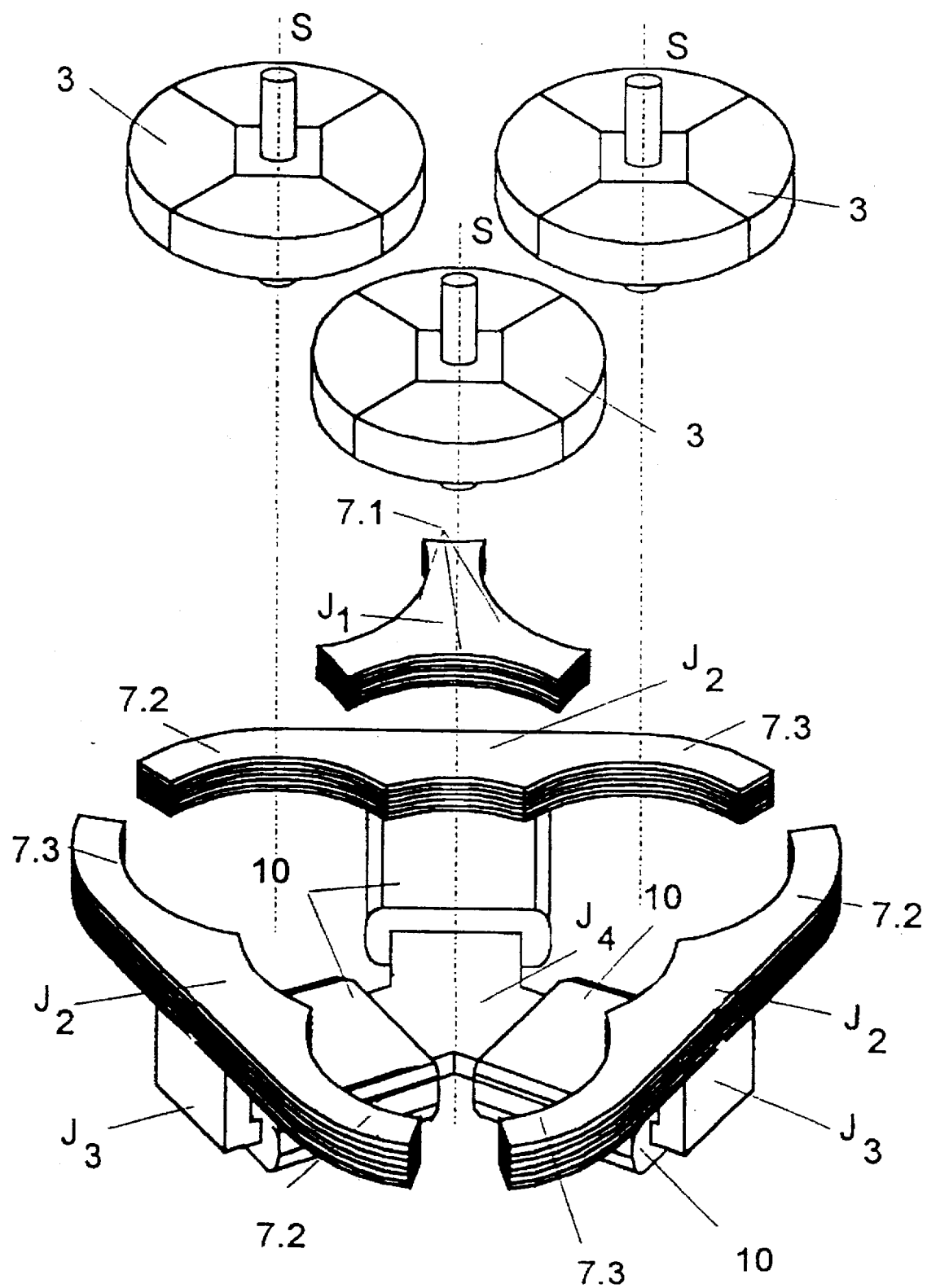
FIG. 3 shows the drive system of FIGS. 1 and 2 with the rotors removed and the yoke-iron member removed, which member connects respective ones of three stator pole configurations.

In the basic diagram of FIG. 1 the motor looks comparatively large but in reality this is not the case. To illustrate the dimensions, FIGS. 2 and 3 show an embodiment with radial flux guidance and FIGS. 4 and 5 show an embodiment with axial flux guidance.

Each rotor 3 can rotate in the field of the stator poles 7. As is shown in FIG. 3, the stator poles 7.1 inside the circle 4 are formed at interconnected yoke irons $J_1$, which are situated, magnetically isolated, underneath the central iron yoke $J_4$. In FIG. 3 the three respective stator poles 7.1, 7.2. 7.3 are visible between which the rotors 3 can rotate. The stator poles 7.2 and 7.3 each lead to the yoke bridges $J_2$, which are adjoined by the yoke irons $J_3$ carrying the excitation coils 10. The central member $J_4$ then forms the return yoke between the yoke irons $J_3$. For the sake of clarity FIG. 3 shows the three rotors 3 and the yoke-iron member $J_1$ separated from the other motor irons and the excitation coils 10.

The rotors 3 consist of two-pole or four-pole radially magnetised magnetic material adjacent the air gap 6. At the air gap northpoles and southpoles alternate in the circumferential direction and it is possible to employ a pole core of a soft-magnetic iron material.

Figure 4:
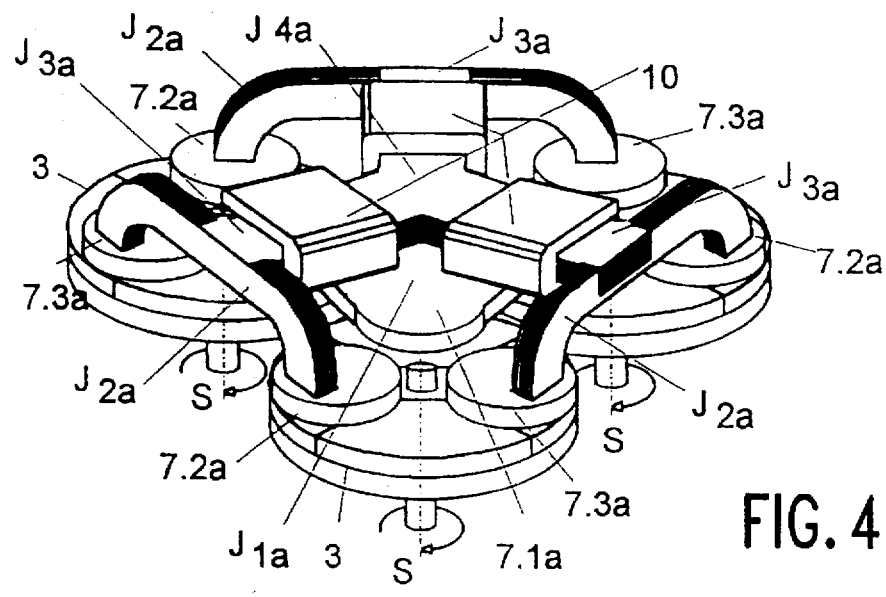
FIG. 4 shows the drive system of FIG. 1 in an axial-flux arrangement.
Figure 5:
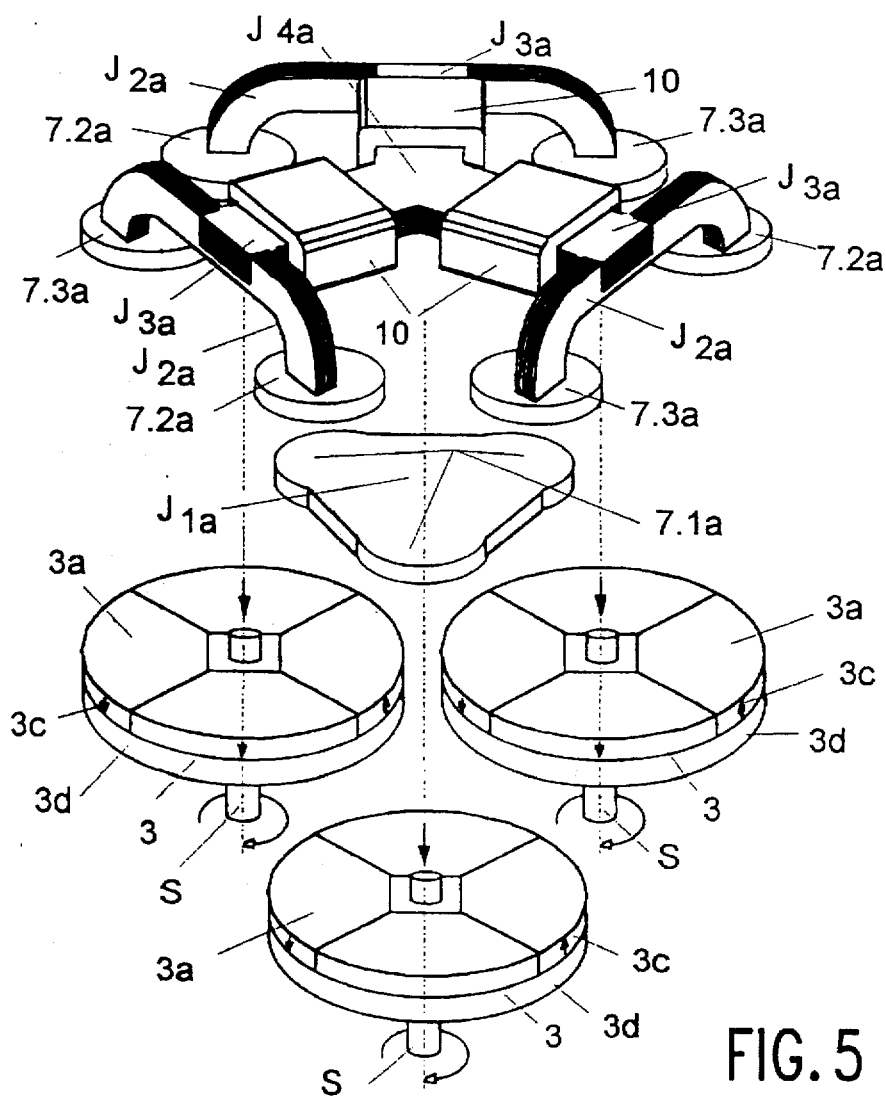
FIG. 5 shows the drive system of FIG. 4 with the rotors removed and the iron yoke member removed, which member connects respective ones of three stator pole configurations.

FIGS. 4 and 5 show a motor construction having axial flux guidance in the rotors 4 but complying with the basic diagram of FIG. 1. The stator poles 7.1a, 7.2a, 7.3a adjoin the end faces 3a of the rotors at a distance from the air gap 6, so that they extend over upper peripheral areas 3b of the axially magnetised rotors. The stator poles 7.2a, 7.3a are interconnected by yoke bridges $J_{2a}$. The yoke bridges $J_{2a}$, are adjoined by the yoke irons $J_{3a}$ carrying the excitation coils 10. In the centre the yoke irons $J_{3a}$ are again connected via the central iron yoke $J_{4a}$.

The rotors 3 each comprise two sandwiched discs 3c, 3d. The disc 3c adjoining the air gap 6 consists of a two-pole or four-pole axially magnetised magnet material. Northpoles and southpoles then alternate in the circumferential direction at the air gap. The disc 3d which is remote from the air gap consists of a soft-magnetic iron material and forms the pole core.

Figure 6:
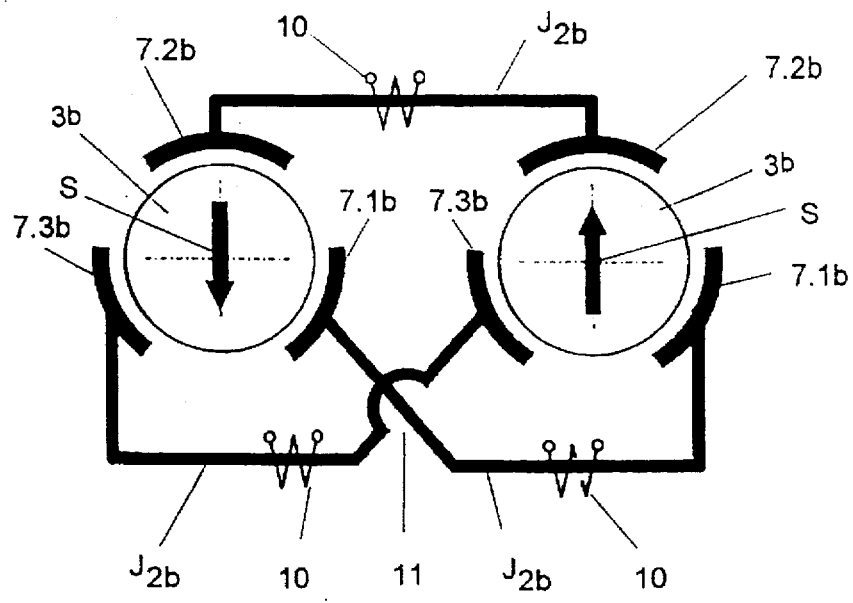
FIG. 6 is a basic diagram of an electrical driving device comprising two permanent-magnet rotors and three excitation coils arranged in the stator so as to form a three-phase motor, the two rotor shafts being juxtaposed.

An electrical driving device shown in FIG. 6 comprises two permanent-magnet rotors 3, whose shafts 3S are juxtaposed at a distance A from one another. Each of the cylindrical rotors 3 is associated with three stator poles 7.1b, 7.2b, 7.3b, which are spaced from the cylinder circumference by air gaps 6 and which are connected in pairs via yoke bridges $J_{2b}$. These yoke bridges $J_{2b}$ carry excitation coils 10. The stator poles 7.1b, 7.2b and 7.3b consist of solid iron or electric sheet. The permanent-magnet rotors 3 consist of a permanent-magnet material and are magnetised diametrally.

Figure 7:
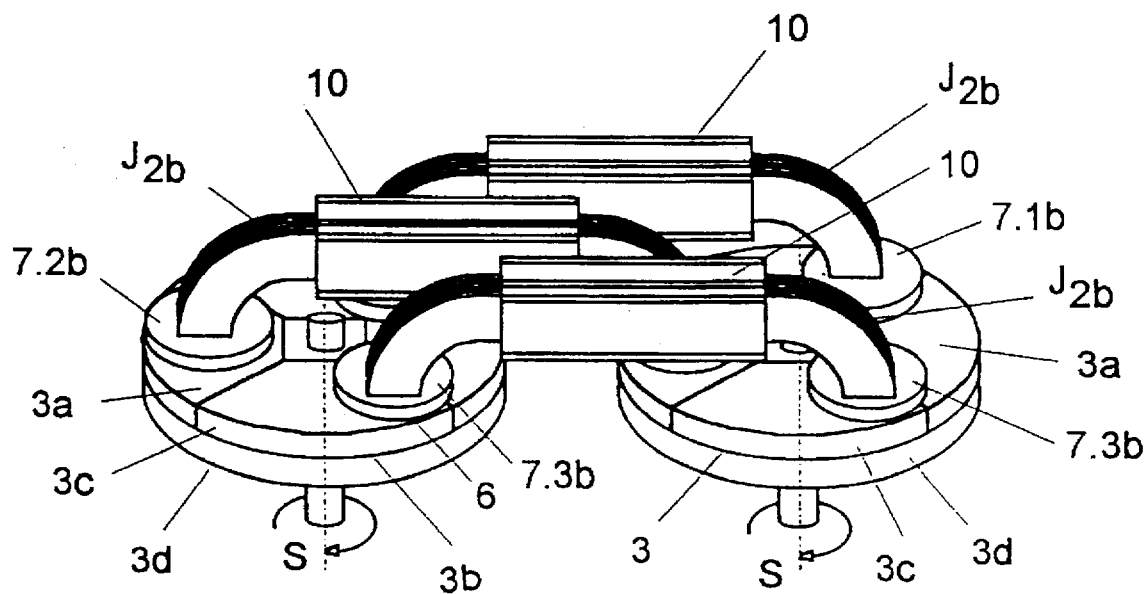
FIG. 7 is a perspective view of the drive system shown in FIG. 6, comprising two permanent-magnet rotors and three excitation coils in an arrangement with axially magnetised four-pole rotor discs.

The basic diagram of FIG. 6 shows a cross-over point 11 of two yoke bridges $J_{2b}$, which are not magnetically connected at this location. To illustrate the actual construction FIG. 7 shows a four-pole motor with axial flux guidance.

Each rotor 3 can rotate in the field of the stator poles 7b. FIG. 7 shows the three respective stator poles 7.1b, 7.2b, 7.3b between which the rotors 3b can rotate. The stator poles 7.1b, 7.2b, 7.3b adjoin upper end faces 3a of the rotors 3 at a distance from the air gap 6, so that they extend over upper peripheral areas 3b of the axially magnetised rotors.

The stator poles 7.2b, 7.3b are connected by yoke bridges $J_{2b}$, which in their turn carry excitation coils 10.

The rotors 3 each comprise two sandwiched discs 3c, 3d. The disc 3c adjoining the air gap 6 consists of a two-pole or four-pole axially magnetised magnet material. Northpoles and southpoles then alternate in the circumferential direction at the air gap. The disc 3d which is remote from the air gap consists of a soft-magnetic iron material and forms the pole core.

In FIG. 6 the two-rotor motor is shown as a radial-flux motor and in FIG. 7 it is shown as an axial-flux motor. In the same way as with the three-rotor motor it is again possible to opt for a radial-flux or axial-flux configuration, as desired.

In this way it is possible to construct electrical driving devices with two or three rotors in accordance with the requirements. Common to all the rotors is that they have a pole pair number p=1 or 2 and are either axially or radially magnetised, depending on the constructional requirements.

Commutation of the excitation coils is effected electronically.

Figure 8:
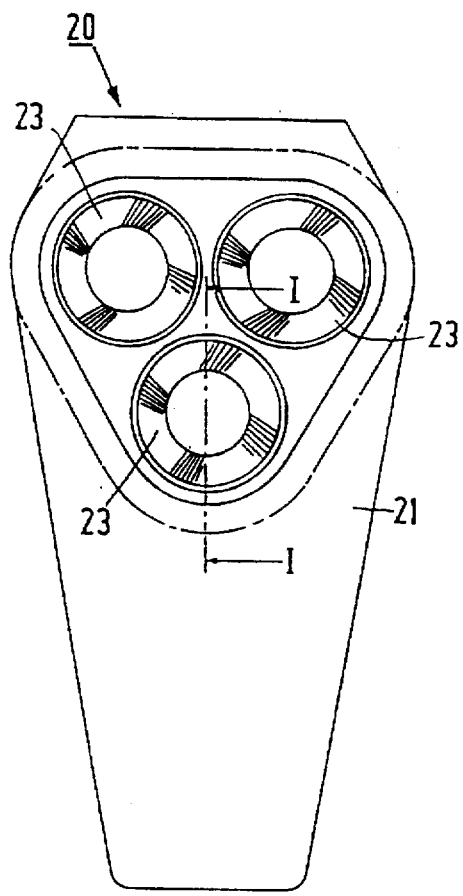
FIG. 8 is a front view of a shaver according to the invention.

FIG. 8 shows a front view of a shaver according to the invention. The shaver 20 comprises a housing 21 and a plurality of shaving heads 23.

Figure 9:
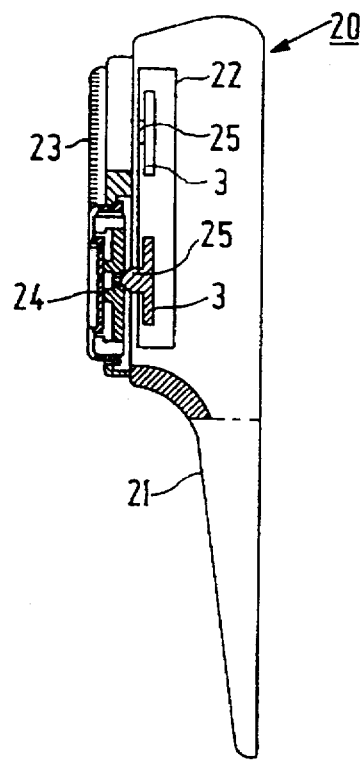
FIG. 9 is a cross sectional view of the shaver of FIG. 8.

FIG. 9 shows a cross sectional view of the shaver of FIG. 8 along the plane I—I denoted in FIG. 8. The shaver 20 comprises an electric driving device 22 according to the invention. The electric driving device 22 is positioned near the shaving heads 23. The shaving heads 23 comprise cutters 24. The cutters 24 are directly driven by the axis 25 which are connected to the rotors 3 of the driving device 22.

The electrical driving device 22 is intended particularly for driving small rotary parts such as the cutters 24 in the shaving heads 23 of the triple-head shaver 20. Until now all the cutters were driven jointly by a single motor via a drive mechanism. On the one hand, such a drive mechanism occupies a comparatively large space and, on the other hand, a drive mechanism always gives rise to clearly audible noise and to frictional losses. The electrical driving device 22 allows each one of the rotors 3 to act directly upon an associated one of the cutter 24. In this way, the shaver 20 comprising for example two or three shaving heads 23, can be of a very flat construction.

It will be seen that the objects set forth above and those made apparent from the preceding description are efficiently attained and, since certain changes can be made in the above method and construction set forth without departing from the spirit and scope of the invention, it is intended that all matter contained in the above description and shown in the accompanying drawings shall be interpreted as illustrative and not in a limiting sense.

It is also to be understood that the following claims are intended to cover all the generic and specific features of the invention herein described and all statements of the scope of the invention, which as a matter of language, might be said to fall therebetween.

I claim:

1. An electrical driving device including more than one permanent-magnet rotor and an electrically excitable stator having three stator poles (7) for each of the rotors (3), the device comprising:

three rotors, each rotor being associated with a first, a second and a third stator pole (7), each first stator pole of a rotor being coupled to a first stator pole of another rotor by a first yoke iron, each second stator pole of a rotor being coupled to a third stator pole of another rotor by a second yoke iron, each second yoke iron being coupled to a return yoke by a third yoke iron, each third yoke iron being surrounded by an excitation coil, wherein no other excitation coils other than the excitation coils surrounding the third yoke irons and no other stator poles other than the first, second and third stator poles of each rotor are included within the driving device, the first, second and third stator poles being positioned in the same circumferential sequence for all rotors.

2. An electrical driving device including more than one permanent-magnet rotor and an electrically excitable stator having three stator poles (7) for each of the rotors (3), the device comprising:

two rotors (3), each rotor (3) being associated with a first, a second and a third stator pole (7), the first stator poles coupled to each other by a first yoke iron, the second stator poles coupled to each other by a second yoke iron and the third stator poles coupled to each other by a third yoke iron, each of the yoke-iron connections being surrounded by an excitation coil, wherein no other excitation coils other than the excitation coils surrounding each of the yoke irons and no other stator poles other than the first, second and third stator poles of each rotor are included within the driving device, the first, the second and the third stator poles being positioned in the same circumferential sequence.

3. An electricl driving device as claimed in claim 1 wherein the excitation coils (10) are commutated electronically.

4. An electrical driving device as claimed in claim 1 wherein the rotors (3) have a two-pole or four-pole radial magnetisation.

5. An electrical driving device as claimed in claim 1 wherein the rotors (3) have a two-pole or four-pole axial magnetisation.

6. A shaver (20) comprising a housing (21) and a plurality of shaving heads (23), each shaving head having a cutter (24) wherein the shaver further comprises an electrical driving device (22) according to claim 1, and in that each cutter being driven by an associated rotor (3) of said electrical driving device.

7. An electrical driving device as claimed in claim 2 wherein the excitation coils (10) are commutated electronically.

8. An electrical driving device as claimed in claim 2 wherein the rotors (3) have a two-pole or four-pole radial magnetization.

9. An electrical driving device as claimed in claim 3 wherein the rotors (3) have a two-pole or four-pole radial magnetization.

10. An electrical driving device as claimed in claim 2 wherein the rotors (3) have a two-pole or four-pole axial magnetization.

11. An electrical driving device as claimed in claim 3 wherein the rotors (3) have a two-pole or four-pole axial magnetization.

12. A shaver (20) comprising a housing (21) and a plurality of shaving heads (23), each shaving head having a cutter (24) characterized in that the shaver further comprises an electrical driving device (22) according to claim 1 wherein each cutter is driven by an associated rotor (3) of said electrical driving device.

13. A shaver (20) comprising a housing (21) and a plurality of shaving heads (23), each shaving head having a cutter (24) characterized in that the shaver further comprises an electrical driving device (22) according to claim 2 wherein each cutter is driven by an associated rotor (3) of said electrical driving device.

14. A shaver (20) comprising a housing (21) and a plurality of shaving heads (23), each shaving head having a cutter (24) characterized in that the shaver further comprises an electrical driving device (22) according to claim 4 wherein each cutter is driven by an associated rotor (3) of said electrical driving device.

15. A shaver (20) comprising a housing (21) and a plurality of shaving heads (23), each shaving head having a cutter (24) characterized in that the shaver further comprises an electrical driving device (22) according to claim 5 wherein each cutter is driven by an associated rotor (3) of said electrical driving device.

* * * * *